United States Patent [19]

White

[11] Patent Number: 4,573,133
[45] Date of Patent: Feb. 25, 1986

[54] SIGNAL PROCESSOR FOR COMPENSATING DETECTOR NON-UNIFORMITIES

[75] Inventor: Stanley A. White, Santa Ana, Calif.

[73] Assignee: Rockwell International Corporation, El Segundo, Calif.

[21] Appl. No.: 486,467

[22] Filed: Apr. 19, 1983

[51] Int. Cl.[4] .................. G06F 15/36; G01C 25/00
[52] U.S. Cl. .................... 364/571; 364/553; 375/12; 455/63
[58] Field of Search ............ 364/571, 573, 578, 718, 364/719, 553, 554; 375/12, 14; 455/63, 296, 307; 358/163

[56] References Cited

U.S. PATENT DOCUMENTS

| | | | |
|---|---|---|---|
| 4,192,005 | 3/1980 | Kurtz | 364/571 |
| 4,315,319 | 2/1982 | White | 364/571 |
| 4,481,596 | 11/1984 | Townzen | 364/571 |

FOREIGN PATENT DOCUMENTS 0022129 2/1980 Japan .................. 364/571

OTHER PUBLICATIONS

IEEE Trans. Circuits & Systems, Apr. 1981 (vol. CAS 28, No. 4), "An Error Cancellation Digital-Filter Structure and its Distributed-Arithmetic Implementation", Chang et al., pp. 339-342.

Primary Examiner—Errol A. Krass
Assistant Examiner—Kevin J. Teska
Attorney, Agent, or Firm—H. Fredrick Hamann; Daniel R. McGlynn; David J. Arthur

[57] ABSTRACT

A signal processing device for the correction of signal amplitude distortion occurring in a plurality of signalling channels such as obtained from a detector array in which each detector has a different non-uniform response. Compensatory amplitude adjustment is made to each sampled signal in accordance with the statistical deviation of the signal from a preselected statistical model. A signal sampling device employs each sampled signal as a write-address for generating a statistical amplitude distribution function. Inverse distribution function means, responsive to addressing by the distribution function, provides an output signal of compensatorily modified amplitude for each signal sample.

17 Claims, 5 Drawing Figures

SIGNAL PROCESSOR FOR COMPENSATING DETECTOR NON-UNIFORMITIES

BACKGROUND OF THE INVENTION

1. Field of the Invention

The invention relates to signal processing systems, and in particular to a system for providing real-time correction of nonuniformities in signals from a plurality of signal sources, such as from a detector array.

2. Description of the Prior Art

The response of a given detector cell in a mosaic array of sensors usually increases monotonically with excitation and exhibits no hysteresis. Deviation from linearity is hoped to be (but often isn't) small; therefore the detector often is modeled as a linear device (without dynamics), described by its bias and gain. Since the bias and gain are different for each cell, calibration and correction procedures are used to adjust the bias and scale factor of each cell to attempt a reasonably uniform response among the detectors of the array. (J. P. Rode, "Nonuniformity Correction in a Multielement Detector Array," U.S. Pat. No. 4,298,887, Nov. 3, 1981). Those focal planes must be rejected whose cell responses are not readily approximated by single straight-line segments over the operating range. Real cells exhibit responses that are not only nonlinear, but slowly time (actually temperature or other environmental-parameter) varying. However, the absolute linearity of each response is not as important as the uniformity of the corrected response from cell to cell.

SUMMARY OF THE INVENTION

Briefly, and in general terms, the invention provides a signal-processing system comprising a multiple signal source providing a plurality of signals each having been subjected to nonlinear amplitude distortion; and a plurality of nonlinear distortion compensation means driven by said signals, each one of said nonlinear distortion compensation means having different distortion compensation parameters, and which function to generate compensated output signal amplitude samples in response to distorted sampled signal amplitude inputs of said signals as a function of the amplitude density function of the signal history of said respective signal.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF THE PREFERRED EMBODIMENTS

The present invention describes a signal-processing procedure which can be applied to each signal from an array of cells whose input-output amplitude responses can be modeled by single-valued functions whose first derivatives are positive everywhere within the operating range. This procedure is an improvement of a technique which was developed for, and successfully applied to, nonlinearly distorted speech signals. (V. A. Vitols & S. A. White, "A Nonlinear Signal Processor", U.S. Pat. No. 4,315,319, Feb. 9, 1982.)

Figure 1:
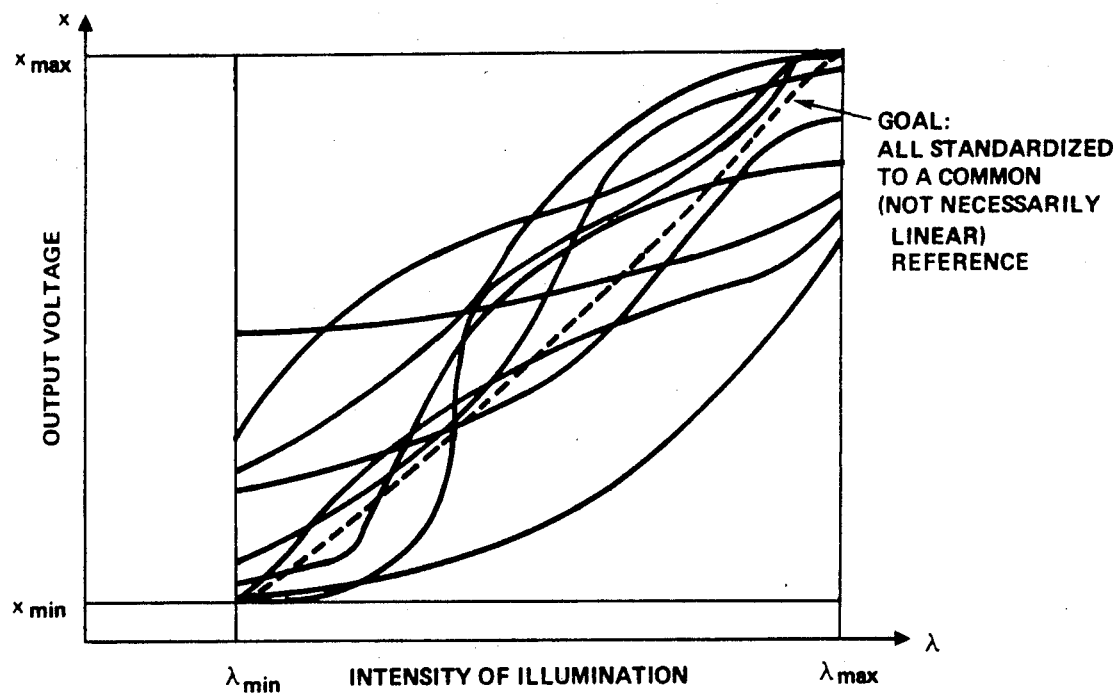
FIG. 1 is a graph which provides a representation of the output signals from a plurality of detectors in an array as a function of the intensity of lumination on such detectors as is known in the prior art.

The present invention provides:

1. a nonlinearity corrector which is applied to the output signal from each of the many detectors whose amplitude linearity responses are different, as indicated in FIG. 1.

Figure 2:
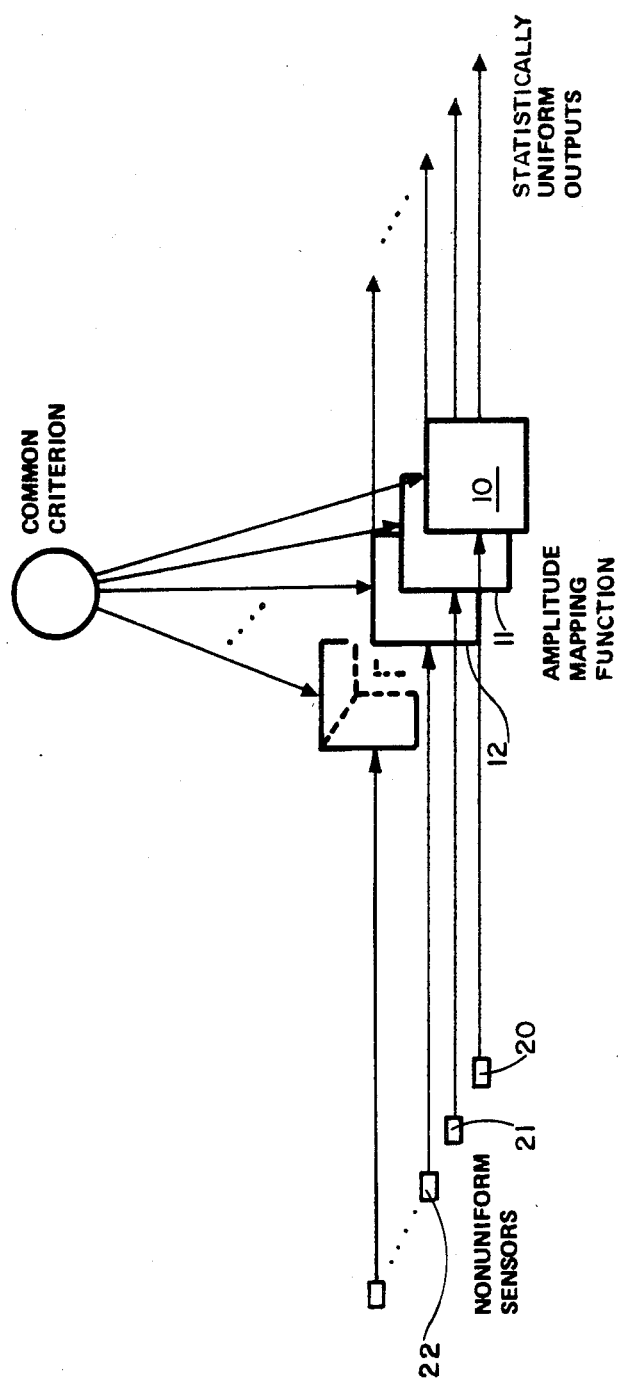
FIG. 2 is a highly simplified block diagram of the signal processor system according to the present invention.

2. although we lack a criterion which can force perfect compensation of all of the signals, by using a common criterion we can at least force a uniformity in the responses as indicated in FIG. 2.

3. part of the mechanization of the density/distribution function computation of our U.S. Pat. No. 4,315,319 was discussed in our co-pending application for a computing device, U.S. Ser. No. 346,829. The present invention describes a further improvement to that computation which reduces the computational error.

Generalized gain mapping permits a sensor signal to be not only scaled and biased but arbitrarily shaped, as long as the input-output relationship is single valued. Since we are specifying a gain mapping, this procedure as described does not include considerations of system (e.g., sensor or signal) dynamics; we are considering only amplitude gain mapping.

The input to the signal processor is the output signal from a specific sensor and is an independent variable which may be interpreted as the read address of a random-access memory (RAM). The output value which is read from that memory has been predetermined and previously written into the RAM location which was addressed by that input variable.

The mapping memory may be operated on a 2-cycle clock such that during the first half of the cycle time the memory content is addressed and the value which is being read is latched in the memory-output register. During the second half of the cycle the mapping memory may be updated. Typically the update write address may be the state of a counter which is driven by a pulse train whose frequency is that of the input data sample rate. The data which is to be written into the memory locations is computed by a processor which is driven by both the read address and the write address.

A period of time is established in which we assume that the scene statistics for each detector is the same. This could be during a calibration period or during actual on-line operation. A running histogram is compiled for the output of each detector, then normalized to form a set of amplitude-density functions.

A reference density function may be predetermined or it may be computed from the set of actual input amplitude-density functions. This reference function is used to determine the nonlinear gain map for each of the detectors so that new amplitude-density functions which could be formed from the gain-mapped detector outputs would all be the same.

The amplitude statistics of the input signal are compared to the model amplitude statistics. An amplitude transformation is defined which then maps each detector-output-sample value into a new mapped output-sample value of amplitude selected such that the statistics of the corrected signal at the output of the signal-amplitude mapper match those of the model reference.

Turning next to the drawings, FIG. 1 is a graph which provides a representation of the output signals from a plurality of detectors in an array as a function of the intensity of lumination on such detectors as is known in the prior art. The X axis represents the intensity of the illumination and the Y axis represents the output voltage. Each of the individual curves or graphs on the figure represents the output of a different detector in an array. Such detectors have different responses due to their differences in fabrication as well as to different material characteristics. The object of the present invention is to provide some means for compensating for all of the detectors to some standardized or common reference which is not necessarily linear.

FIG. 2 is a highly simplified block diagram of the signal processor according to the present invention in which a plurality of signal processor circuits, 10, 11, 12, and so on, are connected to non-uniform sensors 20, 21, 22, respectively, and so on, to produce statistically uniform output signals. Some type of common criterion is provided to each of the signal processing circuits so that a suitable amplitude mapping is provided so that the corrected outputs are statistically uniform in the manner intended according to the objective of the invention.

Figure 3:
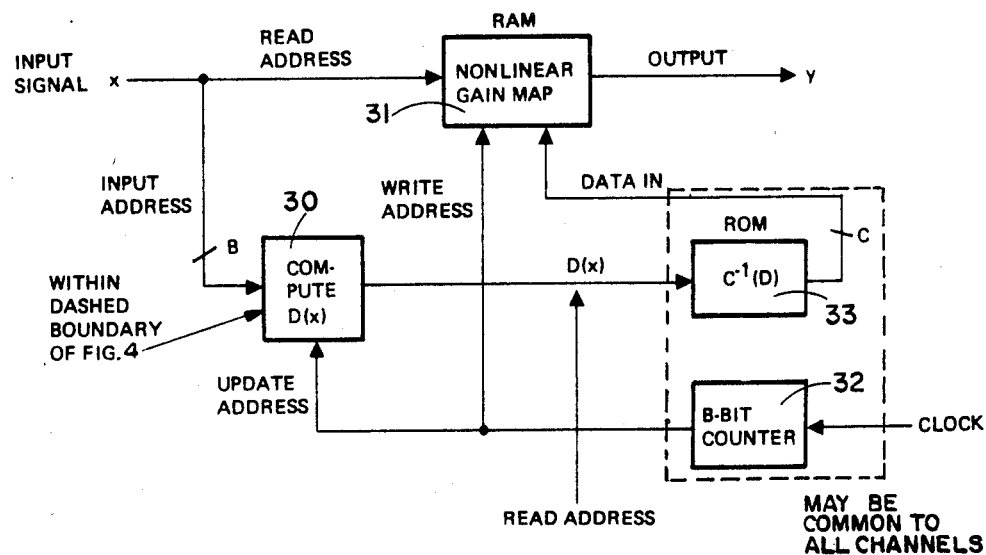
FIG. 3 is a block diagram of the single step correction processor used in the signal processing system according to the present invention.

Turning next to FIG. 3, there is a block diagram of a single step correction processor used in the signal-processing system according to the present invention. The input signal x from the sensor is applied to a compute Element 30 as well as to a random access memory 31. A clock signal is applied to a B-bit counter 32 (where B is the number of bits in the input date word, x, such as 8, 10, 12, etc.) which provides an update address to both the compute Element 30 and random-access memory 31. The input signal x provides an input or read address to both the compute Element 30 which produces an output signal $D(x)$ and the random-access memory 31. The $D(x)$ is used as a read address which is applied to a ROM 33. In response to the read address supplied to the ROM 33 an output labeled DATA-IN is generated which is applied to the RAM 31. The RAM operates in response to receiving both the read address from the input signal, x, a write address from the B-bit counter 32, and the DATA-IN signal from the ROM 33 to produce an output which is labeled y.

Figure 4:
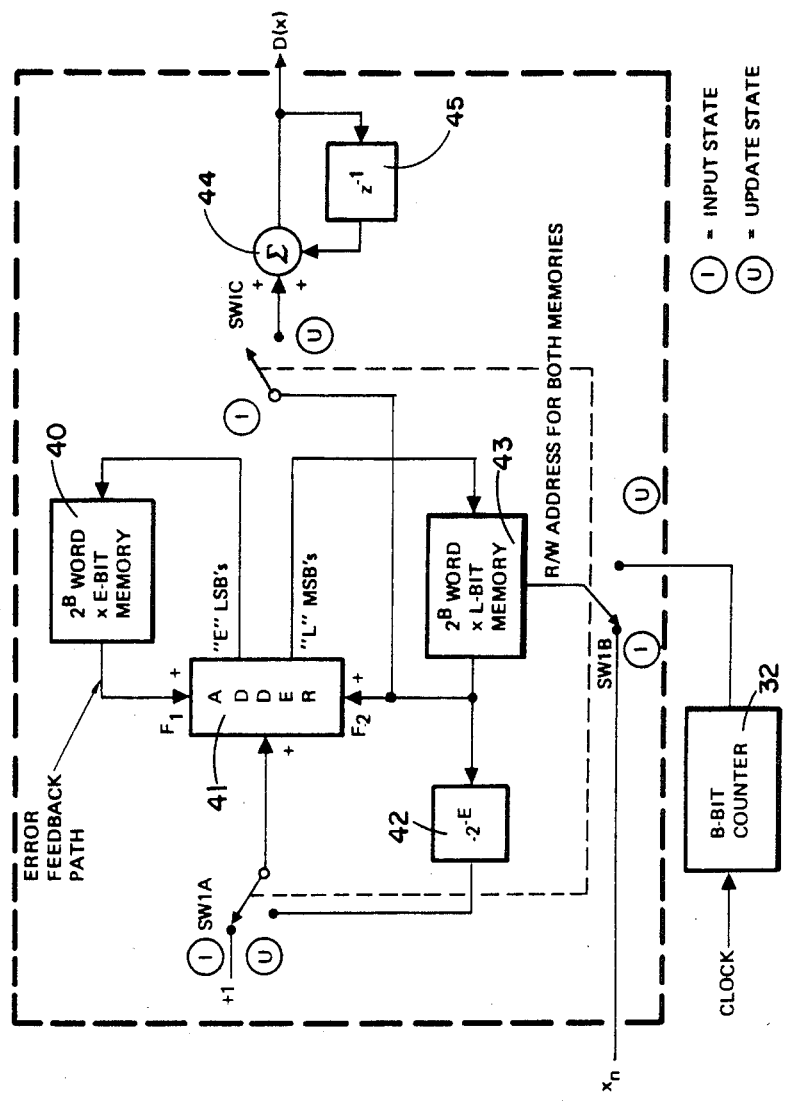
FIG. 4 is a block diagram of the component elements of the D(x) computer box shown in FIG. 3.

Turning now to FIG. 4, there is shown a block diagram of the component elements of the $D(x)$ computing element which was shown in FIG. 3. The $2^B$ word density function is stored in two memories: the L most-significant bits are stored in the L-bit memory, 43; and the E least-significant bits are stored in the E-bit memory, 40. There also exists a 3-input parallel adder, 41; a $-2^{-E}$ scaling multiplier, 42; a 3-gang function switch, SW1A,B, and C, with positions I for input and U for update; and an output accumulator which consists of adder 44 and one-word memory, 45. Memory 40 has an output connected to one input of adder 41. Switch SW1A in position I connects a logic-state "1" as a second input to the adder 41. Scaling multiplier 42 connects the output of memory 43 to the U input of switch SW1A. The L most-significant bits out of adder 41 provide the input to memory 43. The output of memory 43 also provides the third input to adder 41 and the input to the adder 44 of the output accumulator through switch SW1C. The E least-significant bits out of adder 41 provide the input to memory 40. The output of adder 44 provides both the $D(x)$ output and the input to memory 45.

Figure 5:
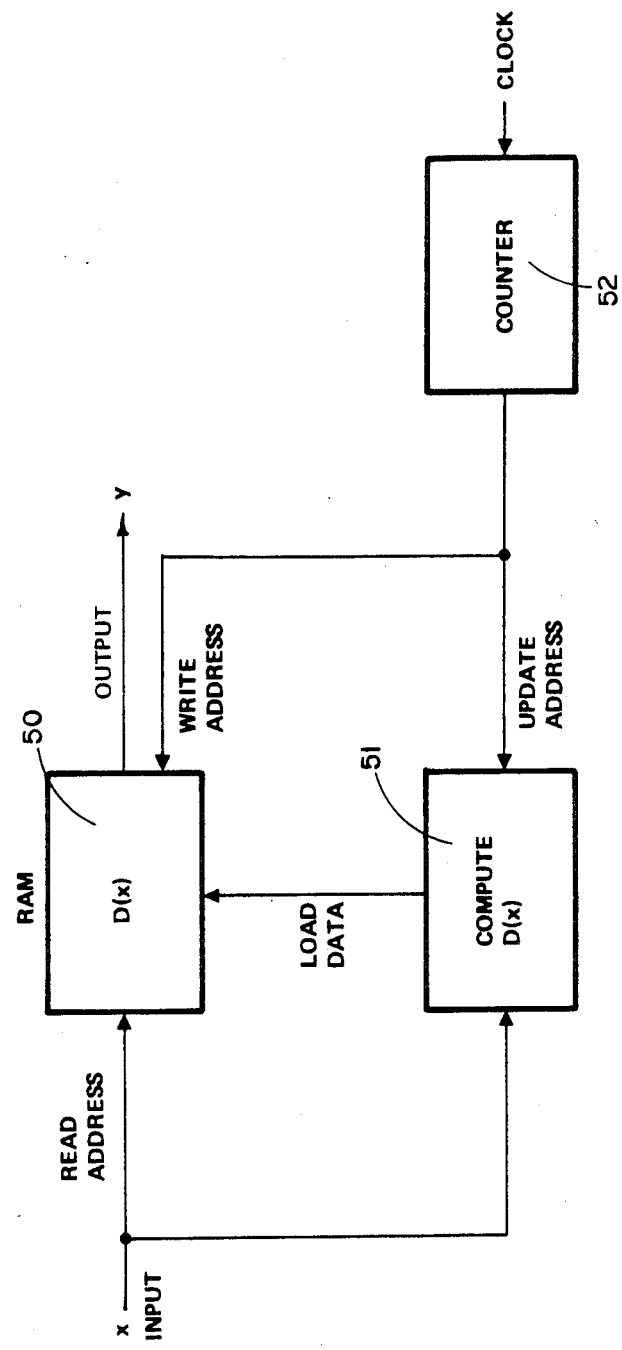
FIG. 5 is another embodiment of the present invention which shows the simplification of FIG. 3 for the case of desired uniform amplitude density functions among the compensated signals.

Turning next to FIG. 5, there is a highly simplified block diagram of another embodiment of the present invention which is applicable to uniform amplitude density functions. The input from the sensors is directly applied to a RAM 50 as well as to compute element 51. The output of the compute element 51 $D(x)$ is read directly into the nonlinear gain map of RAM 50. A clock signal is connected to a counter 52 which produces an update address applied to the compute element 51. The output of the counter 52 is also used to provide a write address connected as an input to the RAM 50. The output of the RAM 50 is the output signal y. Elimination of the ROM 33 of FIG. 3 produces FIG. 5.

The amplitude-density function of the reference function is $c(y)$; its integral, the amplitude-distribution function is $C(y)$. The amplitude-density function of the distorted input signal is $d(x)$; and its integral, the sensor amplitude-distribution function is $D(x)$.

The desired map, $y=g(x)$, is obtained by pairing the upper limits of the two integrals whenever the values of the two integrals are equal. FIG. 3 shows the corrector mechanized as $y=C^{-1}[D(x)]$.

A histogram of a signal is simply a sum-of-occurrences plot. If it is normalized such that the area under the histogram is unity, it becomes the amplitude-density function which is a frequency-of-occurrence plot. The integrated amplitude-density function is the amplitude-distribution function.

Each input signal, $x_n$ is quantitized to B bits, therefore $x_n$ has $2^B$ allowable values.

Each time that the input signal $x_n$ equals some value, X, the content of memory location X is incremented by one. In order to prevent overflow we rescale the memory contents such that the (L-bit) memory-storage capacity is not exceeded by lowpass filtering the memory contents at the same rate that new inputs are being applied. As new information is loaded a B-bit counter is continually stepping through the memory, scaling the contents by gain constant $A=1-2^{-E}$, and reloading the memory with the scaled value. Assume that the memory at some location contains a value, V, which results from some constant-input amplitude, a requirement which will determine the worst-case memory bit-length requirements. This value is related to the maximum capacity of the memory, $M=2^L-1$ by the relationship $$MA=(V+2^B)A=V \tag{1}$$

We can see that $$M=V+2^B \tag{2}$$

since $2^B$ input samples occur (and they could all be the same value) while the rescaling is stepping through the $2^B$ memory locations.

The largest scaled histogram value which we can read out is V, but we need a temporary storage capacity as great as M. therefore, we may solve eqn (1) for V and involve eqn (2):

$$V = \frac{2^B A}{1-A} = \frac{2^B(1-2^{-E})}{1-(1-2^{-E})} = 2^{B+E} - 2^B = 2^{B+E}(1-2^{-E}) \quad (3)$$

Therefore:

$$2^{B+E} = V/A = M = 2^L - 1 \geq 2^{L-1} \quad (4)$$

Clearly:

$$L = B + E + 1 \quad (5)$$

$V = (2^L - 1)A = MA$ is the maximum possible value of the amplitude density function if all samples were dumped into the same bin. If it is scaled properly, the value is unity. The $2^L$ can be viewed simply as an interpretation of the scaling and presents no problem. The scale factor on V is in error and must be corrected by $1/A$, however, this correction already exists on the value which has been read directly out of the memory, M.

The histogram-scaling gain, A, is related to the time constant, $\tau$, of the memory decay by:

$$1 - 2^{-E} = A = e^{-T/\tau} = \exp[-2^B/\tau f_s] \quad (6)$$

where the actual sampling interval of any one memory location is:

$$T = 2^B/f_s \quad (7)$$

and where $f_s$ is the rate at which $x_n$ is sampled. Solving (6) for E:

$$E = -\log_2(1 - e^{-2^B/\tau f_s}) \quad (8)$$

Experience has shown that a $\tau f_s$ product between $5 \times 10^3$ and $10^6$ is in the most useful range.

Integer ranges of E are therefore 4–12 bits for B=8, 2–10 bits for B=10, and 1–8 bits for B=12. By scaling an L-bit number by $(1-2^{-E})$ and placing only the L most significant bits back into the amplitude-density-function memory, there is a resulting error which we must limit.

The memory at any single location and the ancillary input and scaling circuits can be modeled as a first-order recursive filter. The roundoff error can be controlled by error feedback. (T. L. Chang and S. A. White, "An Error-Feedback Digital Filter and Its Distributed Arithmetic Implementation," IEEE TRANS., Vol. CAS-28, No. 4, April 1981, pp 334–342).

Refer now to FIG. 4. During the first half of the clock cycle the switches are in the input "I" state.

The input sample, $x_n$, is picked up by switch SW1B through which the input addresses that memory 43 location which is numerically equal to the value of $x_n$. Through switch SW1A the value of the content of the memory location is augmented by 1 and placed back into the memory. During the second half of the same clock period the switches SW1A,B, and C, then toggle to the update, or "U" state. The state of the B-bit counter 32 is now the memory address. The content of the corresponding memory 43 location is scaled by $A=(1-2^E)$ via adder 41 and scaling multiplier 42, summed with the content of memory 40 and read back into the memories 40 and 43. Simultaneously that same data via SW1C is added into an accumulator which consists of adder 44 and memory 45 and which is forming the amplitude-distribution function. At the beginning of the next clock period these switches toggle again to the input of "I" state.

If the model statistics call for a uniform amplitude-density function, the ROM 33 of FIG. 3 may be eliminated and the RAM output would provide y directly as shown in FIG. 5. Although the proper output is unlikely to be D(x), the output is likely to be a scaled and biased version of D(x). The scaling and biasing can be built into the computation of D(x).

While the invention has been illustrated and described as embodied in a Signal Processor for Compensating Detector Non-uniformities, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitutes essential characteristics of the generic or specific aspects of this invention, and, therefore, such adaptations should and are intended to be comprehended within the meaning and range of equivalence of the following claims.

What is claimed is:

1. A system for compensating adjustment of an ensemble of N sampled input signals, the system comprising:
    an address counter;
    a plurality of signal processors, each coupled to receive a corresponding one of said N sampled input signals, wherein each of said signal processors comprises:
    a first memory;
    a second memory;
    an incrementer for incrementing the value stored at a given location in said first memory in response to detection of a predetermined condition of said input signal;
    a scaler for scaling the value stored at a given location in said first memory in response to an output from said address counter, combining the scaled value with the value stored in a corresponding location in said second memory, storing the most significant bits of the scaled value back in said first memory, and storing the least significant bits of the scaled value in said second memory; and
    means for placing on an output line an accumulation of values stored at locations zero through a given location in said first memory in response to an output from said address counter; and
    a memory for applying to signals on said output lines of said plural signal processors a function.

2. The system of claim 1 wherein each of said signal processors additionally comprises an accumulator coupled to said output line of said signal processor.

3. The system of claim 2 wherein said incrementer is responsive to an input signal of a predetermined amplitude to access a corresponding memory location.

4. The system of claim 3 wherein said function comprises the inverse of a reference amplitude distribution function.

5. A system for compensating adjustment of an ensemble of N sampled input signals, the system comprising:
   an address counter; and
   a plurality of signal processors, each coupled to receive one of said N sampled input signals, wherein each of said signal processors comprises:
      a first memory;
      a second memory;
      an adder for incrementing the value stored at a given address in said first memory in response to the detection of an input signal having a predetermined amplitude;
      a multiplier for multiplying the value stored at a given address in said first memory in response to a signal from said address counter;
      an adder for combining said value stored at said given location in said first memory with the output of said multiplier, and with the value stored at a given address in said second memory corresponding to said given address in said first memory, to produce a combined value;
      a first output from said adder for placing the most significant bits of said combined value in said first memory;
      a second output from said adder for placing the least significant bits of said combined value in said second memory; and
      a signal processor output to selectively output values stored in said first memory.

6. The system of claim 5, wherein said output of each of said signal processors comprises an accumulator for accumulating the total value of the numbers stored in said first memory in response to a signal from said address counter.

7. A signal processor for an input signal, the processor comprising:
   an address counter;
   a first memory;
   a second memory;
   means for incrementing the value stored at a given location in said first memory in response to detection of a predetermined condition of said input signal;
   means for scaling the value stored at a given location in said first memory in response to an output from said address counter, combining said scaled value with the value stored in a corresponding location in said second memory, storing the most significant bits of the scaled value in said first memory, and storing the least significant bits of said scaled value in said second memory.

8. The signal processor defined in claim 7 wherein said means for incrementing comprises:
   means for addressing said given location in said first memory in response to detection of said predetermined condition of said input signal and reading out the value stored at said location;
   an adder for incrementing the value read out from said first memory; and
   means for storing the incremented value in said given location in said first memory.

9. The signal processor defined in claim 7 wherein said means for scaling comprises:
   means for addressing said given location in said first memory in response to said output from said address counter and reading out the value stored at said given location;
   means for addressing said corresponding location in said second memory in response to said output from said address counter and reading out the value stored at said corresponding location;
   a multiplier for multiplying the value read out from said first memory;
   an adder for combining the output of said multiplier with the value read out from said first memory, and with the value read out from said second memory to produce said scaled value;
   means for storing the most significant bits of said scaled value in said given location of said first memory; and
   means for storing the least significant bits of said scaled value in said corresponding location of said second memory.

10. A signal processor comprising:
    a first RAM alternatively responsive to an input signal and to the output of an address counter, wherein:
       said first RAM is responsive to said input signal to access an address corresponding to the amplitude of said input signal and read out from said first RAM the value stored at said address; and
       said first RAM is responsive to said address counter output to access an address corresponding to said address counter output and read out from said first RAM the value stored at said address;
    a second RAM responsive to said address counter output to access an address corresponding to said address counter and to read out from said second RAM the value stored at said address;
    a scaler coupled to the output of said first RAM for scaling the output of said first RAM;
    a summer for combining the scaled output of said first RAM with the output of said second RAM to produce a sum, wherein said summer has a first output for writing the most significant bits of said sum to said accessed address of said first RAM and a second output for writing the least significant bits of said sum to said accessed address of said second RAM.

11. The signal processor of claim 10, additionally comprising an accumulator comprising:
    a delay element having an input and an output; and
    a summer for combining the output of said first RAM and the output of said delay element, wherein the output of said summer is coupled to the input of said delay element.

12. A method of compensatory adjustment of a group of sampled input signals, the method comprising:
    inputting each of said sampled input signals into a corresponding one of a plurality of signal processors;
    in each of said signal processors:
       incrementing the value stored at a given address in a first memory in response to receiving an input signal having a predetermined amplitude;
       scaling the value stored at a given address in said first memory in response to a signal from an address counter to produce a scaled value;
       combining said scaled value with the value stored at a corresponding address in a second memory to produce a combined value;
       storing the most significant bits of said combined value in said first memory;

storing the least significant bits of said combined value in said second memory; and outputting an accumulation of values stored at addresses zero through a given address of said first memory in response to a signal from said address counter; and applying a function to said accumulated values outputted from said first memories of said plural signal processors.

13. The method of claim 12 wherein said outputting step in each of said plural signal processors further comprises accumulating values output from said first memory.

14. The method of claim 13 wherein said step of applying a function to said accumulated values outputted from said first memories of said plural signal processors comprises applying the inverse of a reference amplitude distribution function to said values.

15. A method of processing an input signal comprising:

incrementing a value stored at a given address in a first memory in response to receiving an input signal of a predetermined amplitude;

scaling a value stored at a given address in said first memory in response to a signal from an address counter, to produce a scaled value;

combining said scaled value with a value stored at a corresponding address in a second memory to produce a combined value;

storing the most significant bits of said combined value in said first memory;

storing the least significant bits of said combined value in said second memory;

outputting the value stored at a given address of said first memory in response to a signal from said address counter.

16. The method of claim 15 additionally comprising accumulating the values output from said first memory.

17. A method of processing an input signal comprising:

accessing an address of a first RAM corresponding to the amplitude of said input signal;

incrementing a value stored at said accessed address of said first RAM;

accessing an address of said first RAM corresponding to the output of an address counter, to read out a value stored at that address;

accessing an address of a second RAM corresponding to said output of said address counter, to read out a value stored at that address;

scaling the output of said first RAM by a scaling factor;

combining the scaled output of said first RAM with the output of said second RAM to produce a sum;

storing the most significant bits of said sum in said accessed address of said first RAM; and storing the least significant bits of said sum in said accessed address of said second RAM.

* * * * *